US008235435B2

(12) United States Patent
Campbell et al.

(10) Patent No.: US 8,235,435 B2
(45) Date of Patent: Aug. 7, 2012

(54) UTENSIL HANDLE

(75) Inventors: Alexander Colin Campbell, Bluffton, SC (US); Louis F. Genatossio, Shrewsbury, MA (US); Michael Edward Caine, Needham, MA (US)

(73) Assignee: Le Creuset SAS, Fresnoy-le-Grand (FR)

( * ) Notice: Subject to any disclaimer, the term of this patent is extended or adjusted under 35 U.S.C. 154(b) by 148 days.

(21) Appl. No.: 12/583,793

(22) Filed: Aug. 26, 2009

(65) Prior Publication Data
US 2011/0049918 A1 Mar. 3, 2011

(51) Int. Cl.
*A47J 43/28* (2006.01)

(52) U.S. Cl. .............................. 294/7; 16/430

(58) Field of Classification Search ............. 294/7, 57; 16/430, 422
See application file for complete search history.

(56) References Cited

U.S. PATENT DOCUMENTS

| | | | |
|---|---|---|---|
| 1,801,672 A * | 4/1931 | Knowles | 294/7 |
| 3,411,723 A | 11/1968 | Kohn | |
| 3,742,602 A | 7/1973 | Brumwell | |
| 3,835,574 A | 9/1974 | Harwood | |
| D250,628 S | 12/1978 | Seibel | |
| 4,351,080 A | 9/1982 | Grossman | |
| 4,653,142 A | 3/1987 | Upton | |
| 4,672,706 A | 6/1987 | Hill | |
| 4,974,286 A * | 12/1990 | Stowell et al. | 16/421 |
| 5,031,272 A | 7/1991 | Carmien | |
| 5,084,976 A | 2/1992 | Ross | |
| 5,230,154 A | 7/1993 | Decker | |
| 5,339,482 A | 8/1994 | Desimone | |
| 5,421,089 A | 6/1995 | Dubus | |
| 5,481,805 A | 1/1996 | Wilson | |
| 5,588,343 A * | 12/1996 | Rust et al. | 81/489 |
| D399,388 S | 10/1998 | Cohen | |
| 5,829,099 A * | 11/1998 | Kopelman et al. | 16/430 |
| 5,881,421 A | 3/1999 | Ducharme | |

(Continued)

FOREIGN PATENT DOCUMENTS
DE 20122039 U1 1/2004
(Continued)

OTHER PUBLICATIONS
International Search Report and Written Opinion of the International Searching Authority, filed in PCT/IB2010/002322 (formerly PCT/US2010/046490) dated Feb. 1, 2011.
(Continued)

*Primary Examiner* — Saul Rodriguez
*Assistant Examiner* — Gabriela Puig
(74) *Attorney, Agent, or Firm* — Gary L. Bush; Andrews Kurth LLP

(57) ABSTRACT

A handle for a kitchen utensil or the like includes a hand gripping section having a rearward push/pull valley with a varying, substantially elliptical cross-section that forms a floor, a push slope tapering up and forward from the floor, and a pull slope tapering up and back from the floor. The radial cross-sectional area of an end of the pull slope and a radial cross-sectional area of an end of the push slope each are substantially larger than a radial cross-sectional area of the floor. The handle section further includes a ring stop section disposed forward of the push/pull valley with one or more concentric rings extending above a surface of the handle member. The kitchen utensil includes a blade mating section disposed forward of the handle section and configured to receive a blade.

12 Claims, 3 Drawing Sheets

U.S. PATENT DOCUMENTS

| | | | |
|---|---|---|---|
| 5,881,425 A | 3/1999 | Hudson et al. | |
| D411,780 S | 7/1999 | Muller | |
| D426,748 S | 6/2000 | Chau | |
| D427,044 S | 6/2000 | White et al. | |
| D444,030 S | 6/2001 | Backstrom et al. | |
| D454,432 S | 3/2002 | Ancona et al. | |
| D461,680 S | 8/2002 | Kerr | |
| 6,460,256 B2 | 10/2002 | Peppel et al. | |
| D477,498 S * | 7/2003 | Rowe | D7/395 |
| 6,609,443 B2 * | 8/2003 | Murray | 81/20 |
| 7,086,158 B1 | 8/2006 | Halpern | |
| 7,137,166 B1 | 11/2006 | Kraemer | |
| 7,249,793 B1 | 7/2007 | Jabr | |
| D552,414 S | 10/2007 | McRorie, III | |
| D555,422 S | 11/2007 | Munari | |
| D575,102 S | 8/2008 | Rajasekaran | |
| D575,983 S | 9/2008 | Giannone | |
| 7,458,163 B2 | 12/2008 | Tiech | |
| 2001/0001339 A1 | 5/2001 | Garrison | |
| 2002/0124353 A1 | 9/2002 | Holand-Letz | |
| 2003/0014825 A1 | 1/2003 | Rohrig | |
| 2003/0110644 A1 | 6/2003 | Miller | |
| 2004/0172788 A1 | 9/2004 | Heavenor | |
| 2005/0034277 A1 | 2/2005 | Wing | |
| 2005/0150083 A1 | 7/2005 | Roberts | |
| 2006/0032059 A1 | 2/2006 | Corwin | |
| 2007/0163064 A1 | 7/2007 | Wong et al. | |
| 2008/0195084 A1 | 8/2008 | Rinner | |

FOREIGN PATENT DOCUMENTS

| | | | |
|---|---|---|---|
| DE | 202006015114 U1 | * | 2/2007 |
| EP | 0482351 A | | 4/1992 |
| GB | 614411 A | | 12/1948 |
| GB | 1015978 A | | 1/1996 |
| WO | WO01/14106 A1 | | 3/2001 |
| WO | WO 2008/151366 A1 | | 12/2008 |
| WO | WO 2008151366 A1 | * | 12/2008 |

OTHER PUBLICATIONS

Mario Batalitm, "The Italian Kitchen" small silicone spatula—heat and stain resistant silicone, Heat Resistant to 500°.

* cited by examiner

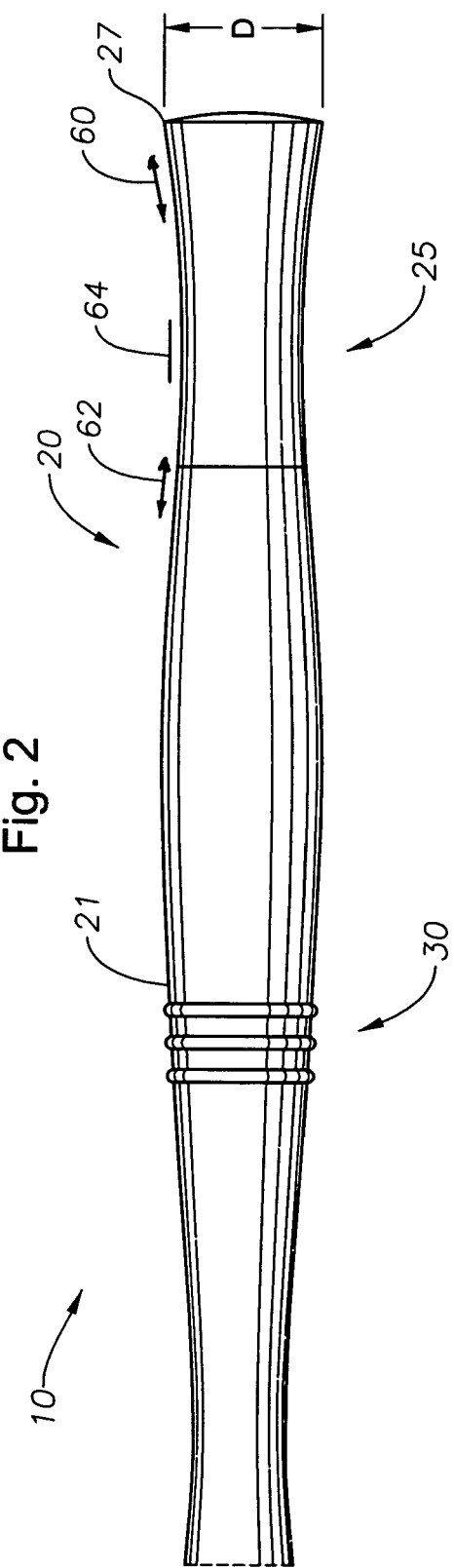
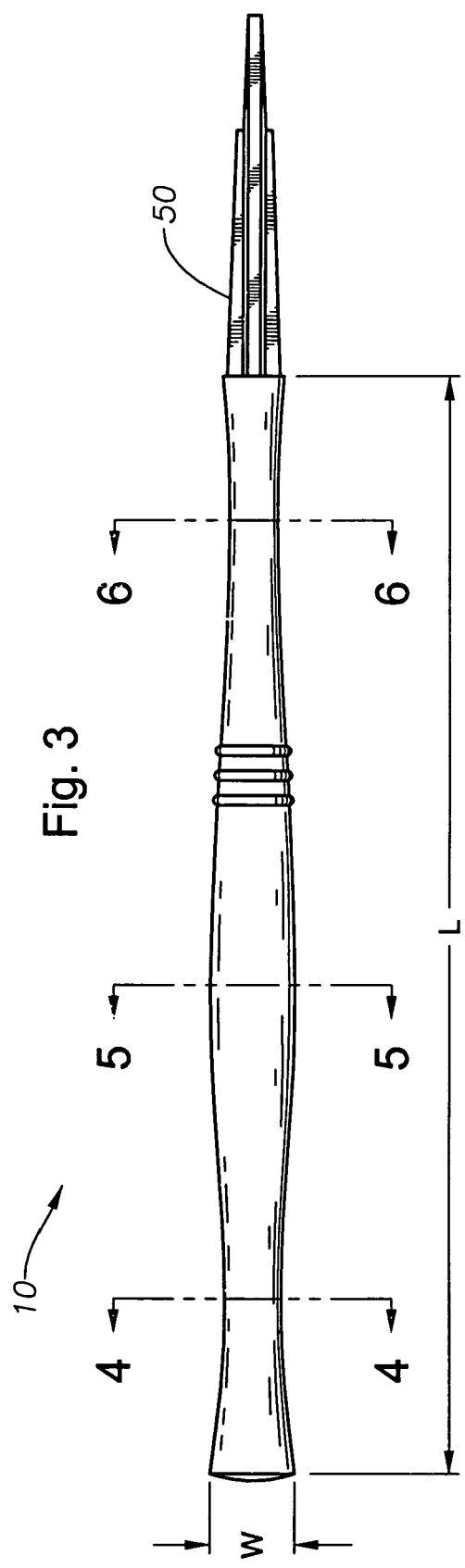

UTENSIL HANDLE

BACKGROUND

1. Technical Field

The technical field concerns handles used with small tools and utensils especially handles for kitchen tools such as spatulas, measuring devices, gadgets and the like.

2. Description of Prior Art

There are a variety of hand-held devices, tools, or utensils that are routinely used in food preparation in home and commercial kitchens. An example of such a utensil is a spatula. A typical spatula is formed with a handle and an adjoined blade. The blade typically has a flat surfaced form. Spatulas are used for a variety of diverse functions, and the specific functions of the spatula dictates the exact shape of the blade. For example, spatulas may be used to spread soft foods, such as mayonnaise. Such spatulas typically have a spatula blade that may have at least one curved edge. Other spatulas may be used in cooking applications, such with foods cooked on a skillet (e.g., flipping pancakes). These spatulas have blades that typically are flat and rectangular or trapezoidal with relatively straight edges. Regardless of the exact shape of its blade, most spatulas are capable of, and may be intended for, use in a variety of orientations.

A kitchen utensil typically enables the user to exert a certain force onto the utensil though the gripping portion, or the handle, to facilitate the function of the utensil. These users may range in age from very young children to very elderly adults. At both ends of this age spectrum, users may have certain physical attributes, or problems, that make the shape of the utensil handle important to comfort and safety. For example, the function of the utensil, such as cutting a piece of meat, may require that the user repeat a movement with the utensil. Repetitive use of a utensil may cause physical strain to the user's hand and wrist, particularly if the utensil slips in the user's hand. Some users may lack the gripping strength to firmly hold the utensil handle, particularly when the handle has a large or a small cross-section, or a simple cross-sectional shape, such as circular. Finally, with users suffering from degenerative diseases such as arthritis that afflict the hand, the shape of the handle may make gripping painful and use of the utensil extremely difficult. Ideally, a kitchen utensil handle will have a shape that facilitates a firm grip while minimizing discomfort and strain, regardless of the age and possible infirmities or physical limitations of the user.

Some current handles enhance the grip of a utensil either by contouring the handle in one of a variety of ways, from a basic cylindrical shape to a curved back with opposing side having ridges that intercalate with the user's fingers. While these designs have their benefits, each is limited by either failing to provide a secure grip or by failing to relieve stress, and sometimes pain, on the user's hand, or both. Furthermore, the designs do not take into account enhancement of the user's grip when the tool is used in more than one orientation, or when the user's hand grips the handle in other than a single, preferred position.

U.S. Pat. No. 6,460,256 to Peppel et al. discloses an ergonomic handle that has a lower surface with an index finger engaging surface and an opposing upper surface with a thumb engaging surface. Alternative embodiments are described that provide concave thumb engaging surfaces either on one side of the handle or the other. While this handle attempts to provide improvements over existing designs, problems still remain. In particular, the underside of the handle only provides a distal abutment for the index finger and fails to secure the remaining fingers.

OBJECTS OF THE INVENTIONS

A primary object of the invention is to provide a handle that is comfortable to use and that allows for a secure grip under a variety of use scenarios.

Another object of the invention is to provide a handle for kitchen use that enhances the ability of a user to push a utensil such as spatula forward or rearward from heavy batter or the like.

SUMMARY

What is disclosed is a kitchen utensil that includes a hand gripping section having a push/pull valley with a varying, substantially elliptical cross-section that forms a floor, a push slope tapering up and forward from the floor, and a pull slope tapering up and back from the floor. The cross-sectional area of an end of the pull slope and a cross-sectional area of an end of the push slope each are substantially larger than a cross-sectional area of the floor. The handle section further includes a ring stop section disposed forward of the push/pull valley that has concentric rings extending above a surface of (or alternatively grooves extending into) the handle member. Finally, the kitchen utensil includes a blade mating section disposed forward of the handle section and configured to receive a blade.

The handle includes a first gripping section and a second gripping section. The first gripping section has a push/pull valley adapted to conform generally to a user's closed hand. The valley includes a downward sloping pull section having a rear end and a rear valley end. The pull section rear end has a larger cross-sectional area than the pull section rear valley end. The valley further includes an upward sloping push section having a front valley end and a front end. The front end has a larger cross-sectional area than the front valley end. The second gripping section is disposed forward of the push/pull valley and includes concentric rings disposed on the handle to allow contact with the user's thumb and fingers.

The handle has an elongated shaft extending longitudinally along an axis, the shaft having an ergonomic grip and a fixture mating end configured for attachment of a fixture. The ergonomic grip has a continuously curved rearward concave/convex section defining a push/pull valley. The push/pull valley is shaped to conform generally to a user's closed hand and to allow generation of force by the user with a pushing motion and with a pulling motion.

DESCRIPTION OF THE DRAWINGS

The Detailed Description will refer to the following figures in which like numerals refer to like objects, and in which:

FIG. 2 is a side view of the exemplary handle of FIG. 1;

FIG. 3 is a top view of the exemplary handle of FIG. 1;

DETAILED DESCRIPTION

Kitchen utensils typically are hand-held devices that are used in food preparation and cooking. Such utensils may be used by people having vastly different physical characteristics, such as age, hand and wrist strength, and joint mobility. To ensure comfortable and safe use, such utensils should have, as part of their design, a handle that may be easily and firmly gripped by a wide range of individuals, and that will allow repetitive use of the utensil without causing the individual any discomfort. To satisfy these needs for a wide range of individuals, disclosed herein is an improved utensil handle.

Figure 1:
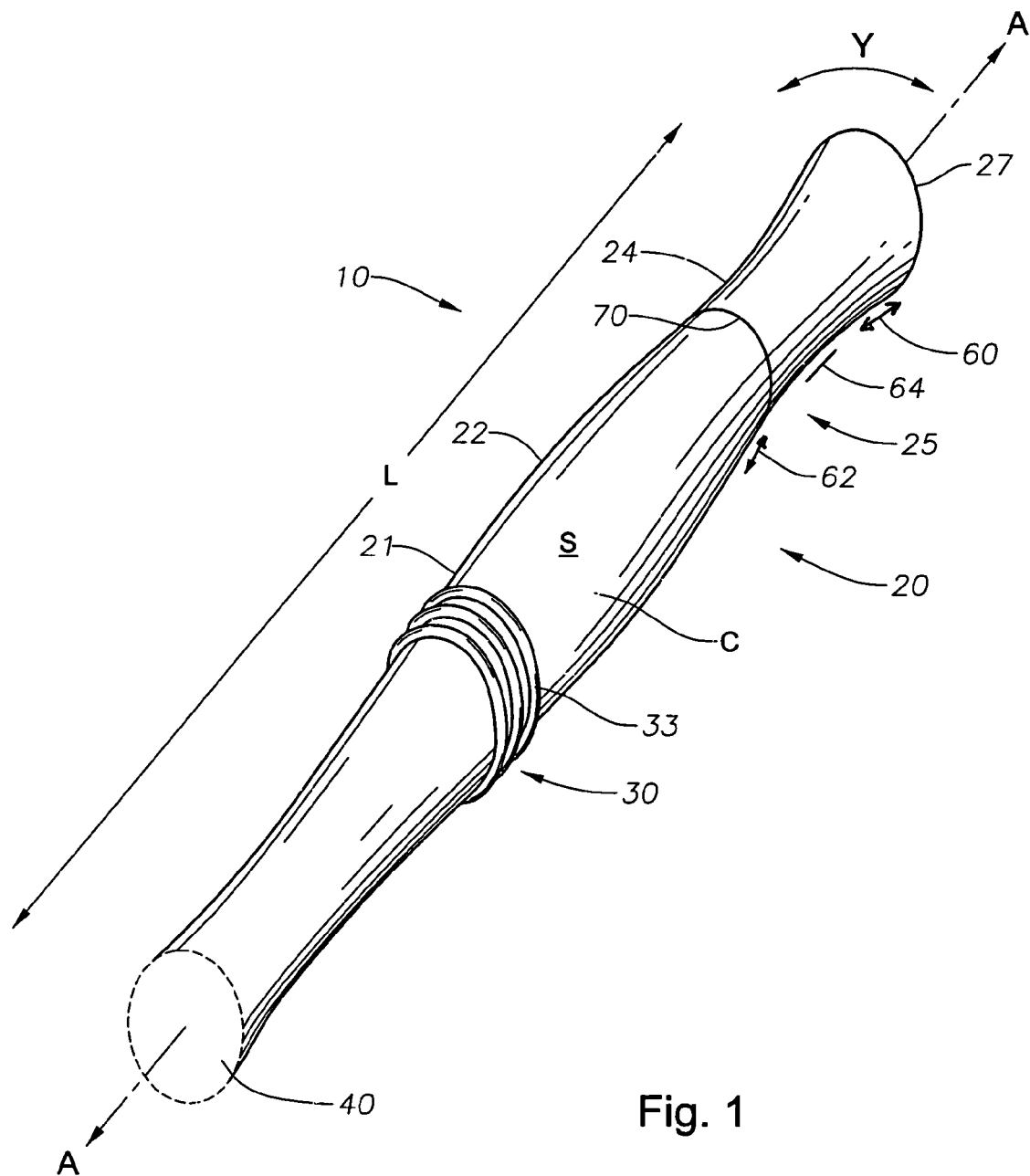
FIG. 1 is a perspective view of an exemplary handle for a utensil.

FIG. 1 is a perspective view of a utensil handle 10 which embodies the invention. The handle 10 has a substantially straight shaft centered on axis A-A. As can be seen, handle 10 also has a basic, substantially elliptical radial cross section, whose periphery constitutes handle circumference C, that varies over length L of the handle. Handle 10 includes a gripping section 20 that begins at gripping stop ring section 30 and extends to the rear end 27. The handle includes a utensil blade mating section 40.

The gripping section 20 is shaped to allow easy and firm gripping by a wide variety of individuals, using a variety of grips. The gripping section 20 includes a convex shaped part 22 which runs from gripping rings 30 toward the rear of the handle and a concave part 24 at the rear end of the handle. The sloping surfaces of the convex part 22 and the concave part 24 cooperate to define a push/pull valley 25 between the end 27 and the push rings 33. As can be seen in FIG. 1, and further in FIG. 4-6, the elliptical radial cross sectional area of the gripping section 20 first increases from the front end 21, then decreases in push/pull valley 25, and finally increases in push/pull valley 25 until handle end 27 is reached. As indicated by line 70 at the valley 25, the rear end of the handle can be formed with a different material or of a different color from the rest of the handle. Alternatively, the entire shaft of the handle can be of a single material or a single color.

The varying cross-section area of the valley 25 results in a downward slope 60 of the valley starting at the end 27 and proceeding forward to a "floor" 64 of the valley 25. The valley 25 then begins an upward slope 62 that ends where the concave valley 25 transitions to a convex form. The downward slope section 60 allows the user to produce a reactive force, and a corresponding "pulling" force, between the individual's hand and the handle 10 when the handle is moved in a rearward direction along the axis A-A. Conversely, the upward slope section 62 allows a "pushing" force to be produced when the handle 10 is moved in the forward direction along the axis A-A. The push rings 33 forward of the valley 25 enhance the user's ability to apply a pushing force in the forward direction.

FIG. 2 shows the utensil handle 10 in a (left) side view. A corresponding right side view (not shown) would mirror the left side view. FIG. 2 shows that the gripping section 20 begins at its front end 21 at gripping stop ring section 30 and ends at handle end 27, and in between the gripping stop ring section 30 and the handle end 27, defines push/pull valley 25. Furthermore, when viewed either from the left side or the right side, the handle 10 is seen to be symmetrical, the utility of which will be discussed below.

The forward slope of push/pull valley 25 enhances the grip of a user when using the utensil in a forward pushing motion. The rearward slope of the push/pull valley 25 enhances the grip of a user when using the utensil in a rearward pulling motion.

Thus, the uprising or expanding elliptical radial cross-sectional area of the handle 10 enhances the user's ability to exert a pushing force on the handle 10. The pull valley 25 with slope 60 enhances the user's ability to exert a pulling force on the handle. Moreover, because the valley 25 runs completely around the periphery of the handle 10, a user is able to generate a pulling or pushing force on the handle 10 with the individual's hand positioned in a variety of locations and with the handle 10 in a variety of orientations. In addition, the valley 25 allows individuals with different size hands, and with varying amounts of grip strength to securely and safely use the utensil.

FIG. 3 shows the utensil handle 10 in a top view. A spatula head 50 is shown attached to handle 10. A corresponding bottom view would show the same features of the handle 10 as does the top view. The handle 10, when viewed from the top (or bottom) has the same basic shape as when viewed from either side, as would be expected in an elliptically shaped device. The elliptically (as opposed to a circular), cross section shape of the shaft enhances the ability of a user to exert a twisting motion on the handle. The changing elliptical shape as a function of length along the handle function tends to prevent the twisting of the handle (e.g. when attached to a spatula head) particularly in the presence of slippery food or cooking materials such as oil. As would be expected, the handle 10, when viewed from the top, has a width W that differs from the handle's height D (see FIG. 2), with the width W being smaller than the height D. This elliptical shape thus accommodates itself more readily to a human hand than does a simple round handle shape, and allows the handle 10 to more closely fit into a loosely or tightly closed human first, whereby a secure grip is enhanced. Furthermore, because of its symmetrical elliptical shape, the handle 10 can be securely and comfortably gripped by both left- and right-handed individuals. Still further, the elliptical shape allows a user to vary her grip angularly (see arrow Y in FIG. 1) around the circumference C of the handle 10 without sacrificing comfort or sureness of grip.

Figure 6:
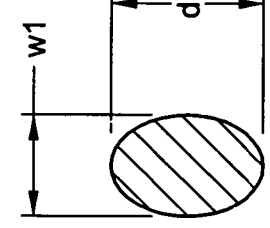
FIGS. 4-6 are cross-sectional views of the exemplary handle of FIG. 1 showing the varying elliptical shape.
Figure 5:
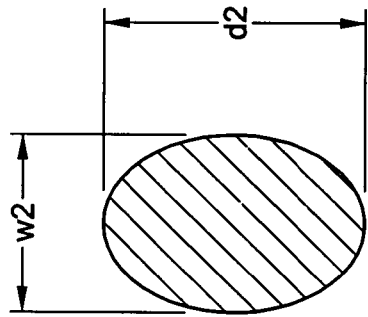
Figure 4:
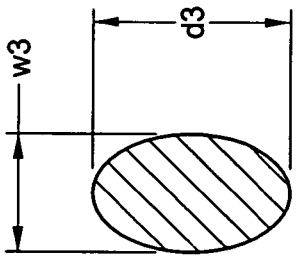

FIGS. 4-6 are radial cross-sectional views of the handle 10 showing the varying elliptical shape. As can be seen, the handle 10 has a vertical major dimension d and a horizontal minor dimension w which varies over its entire length L.

The symmetrical elliptical shape of the handle 10 as shown in FIGS. 1-3 allows the handle 10 to be easily manufactured using a variety of materials and techniques. One such material is wood; another is metal; such as stainless steel; still another is plastic. Thus, the handle 10 may be manufactured though well-known wood or metal shaping processes, may be molded from plastic compounds using well-known molding techniques, or may be formed using well-know metal forming techniques.

In addition to producing the above-described shape of the handle 10, such manufacturing techniques can be combined with various well-known surface treatment techniques to produce a surface finish that increases the frictional coupling between the individual's hand and the handle 10 so as to further enhance the sureness of grip. For example, the handle 10 may be given a non-slip surface treatment, or may be formed to include a number of raised points (bumps) (not shown) that serve to increase friction between the handle surface S and the individual's hand.

As shown in FIGS. 1-3, the handle 10 includes stop ring section 30, which, in one embodiment, includes three "push" rings 33 that each completely circumvent the handle 10. The push rings 33 provide a visual and tactile reference that allows a user to quickly locate her hand on the handle, thereby providing a reference for quickly regrapsing the handle during an operation that may require the user to release and regrapse the handle.

The rings 33 are preferred to be concentric and evenly spaced, but other arrangements are possible. Each ring 33 may be raised slightly above surface S of the handle 10 and may be rounded as shown. Alternatively, each ring may be in the form of a recessed groove. The slightly raised "push" rings 33 may be made of a different material from that of the handle so that the rings may have different characteristics from the handle itself. For example, the rings may be of soft rubber or of silicone on a hard wood shaft. The rings may be of high friction rubber on a smooth wood handle. The rings can be of bright colors verses a natural or contrasting natural color of the shaft so that the rings can be easily identified by the user. The rings may be of "warm" rubber on a "cool" stainless steel metal shaft, etc.

The rings 33 provide a safety feature for the utensil and further enhance sureness of the user's grip. Specifically, the rings 33 allow the individual to stop the motion of his hand along the length L of the handle 10 in the direction toward or away from the blade mating section 40. More specifically, the individual's hand, at the thumb-forefinger end, can contact the stop ring section 30 to prevent sliding of the hand along the length L of the handle 10. In addition, the stop ring section 30 enhances the user's ability to generate additional pushing (or pulling) force on the handle 10 by using the thumb or a finger, or both, or that part of the hand formed by the valley between the thumb and forefinger, to contact one or more rings 33. Such feature is advantageous when using the handle with a spatula head or the like when pushing the tool from various cooking materials such as dense batters or dough.

Figure 7:
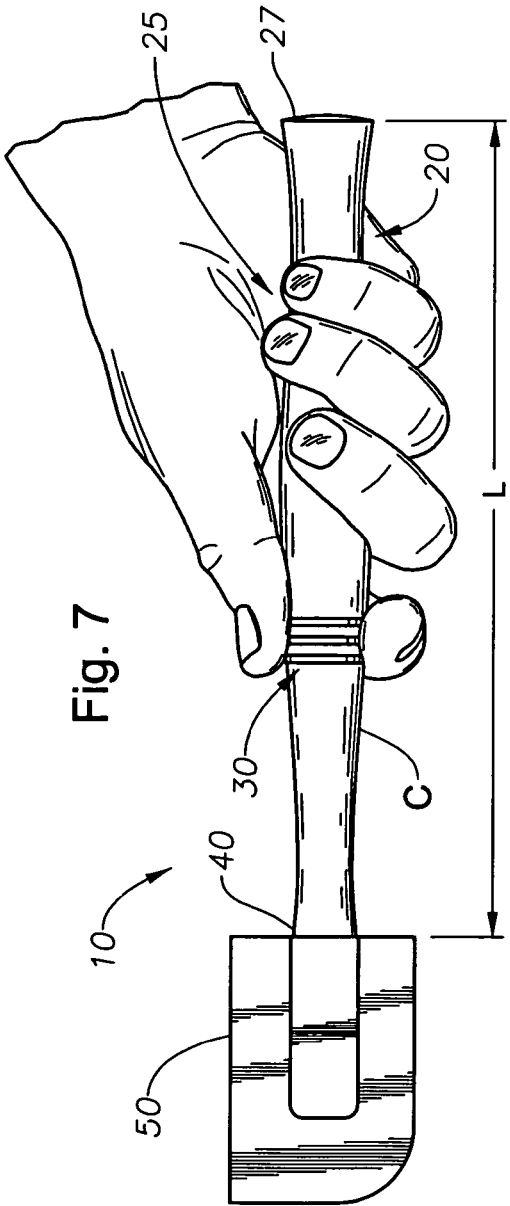
FIG. 7 is a side view of a utensil incorporating the exemplary handle of FIG. 1, as gripped by an individual.

FIG. 7 shows an exemplary use of the handle 10 of FIG. 1 mated to a blade 50 as gripped by a user. FIG. 7 shows that the fore finger and thumb of the individual's hand are in contact with the stop section 30 so as to enhance the pushing of the utensil through heavy batter or the like and to increase the sureness of the individual's grip on the handle 10. The push/pull valley section 25 of the handle 10 fits comfortably in the individual's hand allowing the remaining fingers to curl around the circumference C of the handle 10. The push/pull valley section 25 also enhances a user's ability to pull the utensil through the heavy batter (for example) and allows the individual to generate either a pushing force or a pulling force, in a direction parallel to the length L, on the handle 10 that is in addition to the force generated by contact with the stop section 30. The push/pull valley 25 also enhances the ability of the individual to generate forces radial of the handle 10 so as to produce a "spreading" motion of the blade 50.

Besides its use with a variety of kitchen utensils, including spatulas and knives, the handle 10 of FIG. 1 may be adapted for a variety of non-kitchen uses, such as for gardening, fishing, and other applications where comfort and sureness of grip are considerations.

We claim:

1. A handle (10) comprising:
   a shaft including a valley (25) arranged and designed to conform generally to at least a portion of a user's closed hand, said shaft characterized by radial cross-sections along its entire length, each radial cross-section having an outer surface defined by an ellipse having a center, wherein a straight longitudinal axis passes through each center of each ellipse, and wherein said radial cross-sections change as a function of length, thereby forming a floor (64), a push slope (62) which slopes up and forward from the floor (64), and a pull slope (60) which slopes downward from an end (27) of the shaft toward said floor (64), wherein a cross-sectional area of an end of the pull slope (60) and a cross-sectional area of an end of the push slope (62) each are substantially larger than a cross-sectional area of the floor (64),
   a utensil mating section (40) arranged and designed to connect said shaft to a utensil (50); and
   a ring stop section (30) disposed on said shaft at a location remote from said utensil mating section (40) and forward of said valley (25), said ring stop section (30) including at least one ring (33) having a raised surface above a surface of the shaft and arranged and designed to allow contact with the user's thumb and at least one finger when the user's hand is closed around said valley (25).

2. The handle (10) of claim 1 wherein,
   the ring stop section (30) includes three equally-spaced rings (33).

3. The handle (10) of claim 1 wherein,
   the utensil (50) is a spatula for kitchen use.

4. The handle (10) of claim 1 further comprising,
   a utensil (50) detachably attached to said shaft.

5. A handle (10) for connection to a kitchen utensil (50) comprising:
   a shaft having a blade mating section (40), and a first gripping section, said first gripping section having a push/pull valley (25) arranged and designed to conform generally to at least a portion of a user's closed hand, said shaft characterized by radial cross-sections along its entire length, each radial cross-section having an outer surface defined by an ellipse having a center, wherein a straight longitudinal axis passes through each center of each ellipse;
   said valley (25) including a pull section (60) which slopes downward from a rear end (27) of said shaft to a rear valley end, wherein the pull section rear end (27) has a larger radial cross-sectional area than a radial cross sectional area of the pull section rear valley end, and an upward sloping push section (62) having a front valley end and a front end, wherein the front end has a larger radial cross-sectional area than a radial cross sectional area of the front valley end; and
   said shaft having a second gripping section (30) disposed on said shaft at a location remote from said blade mating section (40) and forward of said push/pull valley (25) characterized by at least one raised concentric ring (33) disposed on said second gripping section (30), said at least one raised concentric ring (33) arranged and designed to allow contact with the user's thumb and at least one finger when the user's hand is closed around said valley (25).

6. The handle (10) of claim 5 further comprising,
   a spatula blade (50) coupled to a forward end of said handle (10), said blade characterized by a thin structure that has horizontal and vertical dimensions and a major axis of each of said cross sectional areas of said shaft is aligned with said vertical dimension of said blade.

7. The handle of claim 5 wherein said blade mating section has a substantially elliptical radial cross section.

8. A handle (10) having a straight longitudinal axis, the handle comprising:
   an elongated shaft extending longitudinally along the straight longitudinal axis of the handle, the shaft characterized by radial cross-sections along its entire length, each radial cross-section having an outer surface defined by an ellipse having a center, wherein a straight longitudinal axis passes through each center of each ellipse, said shaft having an ergonomic grip and a fixture mating end (40) configured for attachment of fixtures, with the ergonomic grip having a continuously curved rearward concave/convex section defining a push/pull valley (25), shaped to conform generally to at least a portion of a user's closed hand and to allow generation of force by the user with a pushing motion and with a pulling motion;

wherein the shaft further has a stop section (30) disposed on said shaft at a location remote from said fixture mating end (40) and forward of said push/pull valley (25), said stop section having a plurality of rings (33) disposed on said shaft, raised above a surface of said shaft, and arranged and designed to contact one or more fingers of a user's hand when the user's hand is closed around said valley (25).

9. The handle of claim 8, wherein,
the elongated shaft changes as a function of length along said shaft.

10. The handle of claim 8 wherein,
said plurality of rings (33) are concentric and equally spaced.

11. The handle of claim 8 wherein,
said plurality of rings are raised from said elongated shaft.

12. The handle of claim 8 wherein,
said plurality of rings are created by grooves formed in said elongated shaft.

* * * * *